UNITED STATES PATENT OFFICE.

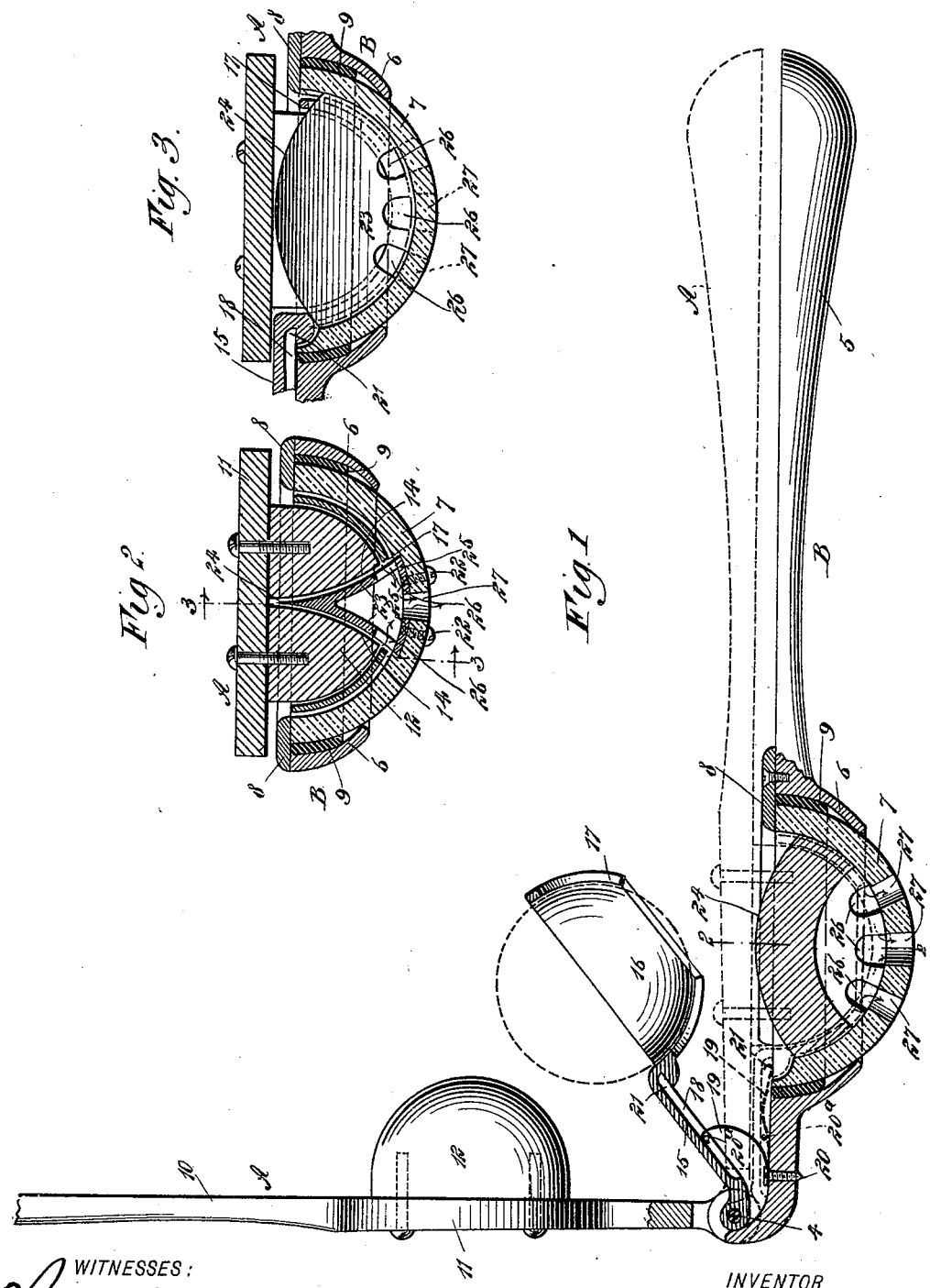

JOHN WALKER NEAL, OF KEALIA, HAWAII.

LEMON-SQUEEZER.

SPECIFICATION forming part of Letters Patent No. 620,047, dated February 21, 1899.

Application filed July 5, 1898. Serial No. 685,122. (No model.)

*To all whom it may concern:*

Be it known that I, JOHN WALKER NEAL, of Kealia, Kauai, Hawaii, have invented a new and Improved Lemon-Squeezer, of which the following is a full, clear, and exact description.

This invention is a lemon-squeezer of that class in which two sections are hingedly connected and provided with a bowl and knife, so that the lemon is forced into the bowl by the movement of the sections toward each other, the knife serving to cut the lemon simultaneously with the squeezing thereof.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1 is a side elevation of the invention with parts in section. Fig. 2 is a cross-section of the invention on the line 2 2 of Fig. 1, and Fig. 3 is a similar section on the line 3 3 of Fig. 2.

The two sections A and B of the lemon-squeezer are pivotally joined to each other by a pin 4. The section B has a handle 5, with an annular socket 6, in which is fitted a porcelain bowl 7 of semicircular form. The bowl 7 is held removably in place by a curved plate 8, screwed to the section B, and a packing 9, of rubber or like yielding material, is interposed between the bowl 7 and socket 6. The section A has a handle 10 matching with the handle 5, as indicated by the dotted lines in Fig. 1. Inward from the handle 10 the section A is formed with a flat portion 11, to which a semicircular follower 12 is rigidly secured, the follower being adapted to extend into the bowl 7 and, as shown in Fig. 2, being formed with a tapering groove 14, extending entirely through it longitudinally with the section A, so as to make room for the knife, which will be hereinafter described.

Mounted to swing on the pin 4 is the shank 15 of the ejector-cup 16, which is provided with a slot 17, registering with the slot 14 and serving the same purpose, such slot extending nearly through the cup 16 and being disposed longitudinally with the sections A and B. The under side of the shank 15 is formed with a groove 18 therein, in which bears the hooked free end of a spring 19, secured by a screw 20 to the section B, directly adjacent to the pivoted end thereof. The shank 15 is provided with a rigid pin $20^a$, extending across the groove 18 thereof and adapted to engage with the hooked free end of the spring 19 when the spring throws upward the shank 15 and ejector-cup 16. By these means the upward movement of the ejector is limited. The normal position of the ejector is that shown in Fig. 1, in which position it is held by the spring 19. When the section A is thrown down over the section B, as indicated by dotted lines in Fig. 1, the follower 12, moving against the ejector-cup, throws the same downward to the position shown by dotted lines in Fig. 1 and by full lines in Figs. 2 and 3, whereupon the ejector-cup enters the bowl 7, and the spring 19 is flattened out on top of the section B and its hooked end projected into a cavity 21, forming a continuation of the groove 18.

The knife is removably secured in the bowl by screws or other fastening devices 22 and comprises two concave walls 23, running upwardly and meeting each other to form a cutting edge 24, which is convex in shape, as may be seen in Fig. 3. Each wall 23 has an inwardly-projected flange 25, which flanges are led into the inner face of the bowl 7 and engaged by the screws 22 before mentioned. The walls 23 are provided at their lower portions with openings 26, through which the juice from the lemon may pass, first between the walls 23 and then out through the bottom of the bowl 7 by way of openings 27 in the bowl.

In using the device the lemon is placed in the ejector-cup 16, as indicated by the dotted lines in Fig. 1. The section A is now thrown down upon the section B, whereupon the follower 12 engages the lemon and pushes the same down with the ejector-cup, causing the lemon to be divided on the cutting edge 24 of the knife and simultaneously squeezed between the follower 12 and the ejector-cup 16. When this operation has been effected, the section A may be raised back to position shown in Fig. 1, whereupon the spring 19 will throw the ejector-cup upward and dislodge the lemon-rind. The several parts may be readily displaced for cleaning or repairing, owing to the removable manner in which they are assembled and to that construction which permits the parts to be so connected.

Having thus described my invention, I claim as new and desire to secure by Letters Patent—

1. The combination of two hingedly-connected sections, an ejector mounted to swing between the sections, a pin attached to the ejector, and a spring, the free end of which engages the ejector and is provided with a hook capable of connection with the pin.

2. In a lemon-squeezer, the combination of two pivotally-connected sections, a bowl carried on one section, a follower carried on the other section and adapted to enter the bowl, a knife rigidly mounted in the bowl, the follower having a slot receiving the knife, and an ejector having a shank swinging on the pivot of the two sections, the ejector being capable of fitting snugly within the bowl and having a slot to receive the knife.

3. A lemon-squeezer having two pivotally-connected sections between which the lemon is squeezed, and an ejector for throwing out the lemon-rind, the ejector being mounted to swing on the pivot that connects the two sections.

JOHN WALKER NEAL.

Witnesses:
EDWARD MCCORRISTON,
SOL. MALUNA.